US006096396A

United States Patent [19]

Patton et al.

[11] Patent Number: 6,096,396

[45] Date of Patent: Aug. 1, 2000

[54] DECORATIVE SHEET MATERIAL SUITABLE FOR USE AS A FLEXIBLE WEATHERABLE PAINT FILM OR DECAL

[75] Inventors: Clyde J. Patton; Don O. Ocampo, both of Charlotte, N.C.

[73] Assignee: Rexam Industries Corp., Charlotte, N.C.

[21] Appl. No.: 09/010,075

[22] Filed: Jan. 21, 1998

[51] Int. Cl.[7] ................................ B32B 7/02; B32B 7/06; B32B 7/12; B32B 27/08; B32B 27/30

[52] U.S. Cl. ......................... 428/40.1; 428/212; 428/352; 428/421; 428/422; 428/483; 428/520; 428/522; 428/914; 427/146; 427/393.5; 427/407.1; 427/412.1; 427/412.4; 427/412.5; 156/297; 156/230; 156/241

[58] Field of Search ..................................... 428/421, 422, 428/480, 483, 40.1, 212, 520, 522, 914; 427/352, 372.2, 383.7, 385.5, 407.1, 146, 393.5, 412.1, 412.4, 412.5; 156/230, 241, 238, 239, 297

[56] References Cited

U.S. PATENT DOCUMENTS

| | | | |
|---|---|---|---|
| 4,810,540 | 3/1989 | Ellison et al. | 428/31 |
| 4,931,324 | 6/1990 | Ellison et al. | 428/31 |
| 4,943,680 | 7/1990 | Ellison et al. | 427/154 |
| 5,215,826 | 6/1993 | Shimanski et al. | 428/483 |
| 5,518,786 | 5/1996 | Johnson et al. | 488/40.6 |

FOREIGN PATENT DOCUMENTS

| | | |
|---|---|---|
| WO 88/07416 | 10/1988 | WIPO . |
| WO 97/46377 | 12/1997 | WIPO . |

*Primary Examiner*—Vivian Chen
*Attorney, Agent, or Firm*—Alston & Bird LLP

[57] ABSTRACT

A flexible, weatherable, decorative sheet material useful as a paint film or decal comprising a pigmented fluoropolymer base coat layer overlying a substantially transparent fluoropolymer clear coat layer wherein the fluoropolymer composition of the base coat layer has a greater elongation than the fluoropolymer composition of the clear coat layer. The base coat and clear coat layer each comprise an alloy of a fluoropolymer composition and an acrylic polymer composition. The base coat layer comprises a fluoropolymer copolymer composition and the clear coat layer comprises of a fluoropolymer homopolymer composition. The fluoropolymer used in the base coat layer has a produced elongation at break of 300% or greater and the fluoropolymer composition used in the clear coat layer has a produced elongation at break of 50% to 250%. The clear coat and base coat layers are cast onto a polyester carrier sheet. An adhesive layer is cast onto another polyester carrier sheet such that the adhesive layer is releasable adhered to the carrier sheet. The adhesive layer is then laminated onto the base coat layer.

15 Claims, 1 Drawing Sheet

DECORATIVE SHEET MATERIAL SUITABLE FOR USE AS A FLEXIBLE WEATHERABLE PAINT FILM OR DECAL

The present invention relates to sheet materials generally and particularly relates to a sheet material which is suitable for use as a flexible, a weatherable paint film on automobile body panels and other surfaces where a paint-like appearance is desirable.

BACKGROUND OF THE INVENTION

Plastic films mounted with pressure sensitive adhesives are used in the automobile industry to add styling features to automobiles. Such films may be pigmented internally, printed and top coated or, alternatively, layered to simulate the appearance of a glossy base coat/clear coat paint finish. Plasticized polyvinyl chloride (PVC) has been used for many years as the polymer building block for the decorative film. Scotchcal, manufactured by 3M, is a typical example. In production, the plasticized PVC is either clear or pigmented to match color requirements and cast as a platisol or organosol onto a casting medium and passed through a drying oven to remove residual solvents and to fuse the composition into a continuous film. In a second process, an acrylic pressure sensitive adhesive is coated from solvent onto a silicone coated release liner and advanced into a drying oven for solvent removal followed by lamination to the cast PVC. The casting base used for producing the PVC film is removed either in-line or in a post operation. The PVC film can then printed and/or top coated and/or die cut into desirable shapes to meet the design requirements.

However, the use of PVC in the conventional plastic film described above creates a number of problems. In recent years consumer demands have increased in both visual and performance requirements and environmental regulations have become more stringent. PVC chemistry cannot meet the extended weathering requirements that the automobile industry is currently seeking. Additionally, the automobile industry is turning away from the use of chlorine-containing materials due to a number of environmental concerns. Also, plasticizers used in the formation of PVC polymers tend to migrate into and through adjacent layers as the plastic film ages. Migration of the plasticizers into the pressure sensitive adhesive layer can lead to reduction in the adhesive bond. Similarly, migration of the plasticizers into the clear coat layer can lead to delamination or loss of surface gloss. Finally, PVC paint films lack the high gloss "paint-like" appearance that is desirable in the automobile industry.

Dissatisfaction with use of PVC polymers has led to attempts to improve performance and appearance of the decorative sheets used to surface automobile body panels. An example of such an attempt is U.S. Pat. No. 5,518,786 (Johnson '786). The Johnson '786 patent discloses a multilayered plastic film wherein the clear coat layer is comprised mainly of a weatherable optically clear polymer containing a fluorocarbon resin and an acrylic resin. The use of such a clear coat yields the desired weatherability and a high gloss/Distinctness of Image (DOI). The Johnson '786 patent further discloses a method for further enhancing the DOI by coating the pressure sensitive adhesive onto a polyester film. However, the Johnson '786 patent is deficient regarding environmental and recycle issues because the base coat is composed of one or more plasticized PVC polymer layers. Plasticizer migration may also effect the long term performance of the Johnson '786 paint film.

To be suitable for exterior automobile use, a paint finish must meet automobile manufacturer's durability standards as well as standards of visual appearance. One important test of visual appearance is referred to as DOI. DOI is a measurement of the clarity of an image reflected by the finished surface. DOI can be measured by any of a number of instruments including the Dorigon Gloss Meter manufactured by Hunterlab, the QMS-BP manufactured by Autospect, and the GLOW-BOX manufactured by $I^2R$. Weatherability of the finish, measured in part by UV resistance, is also an important factor. In addition, the paint finish must exhibit sufficient elongation at room temperatures to enable application and repositioning of the paint finish to three-dimensional complex substrate surfaces.

Therefore, there is a need in the art for a plastic paint film for application to contoured exterior car body members or panels having both the durability and appearance properties necessary for exterior automobile use and possessing the room temperature elongation necessary to be hand applied and repositioned. In addition, there is a need in the art for a plastic paint film that does not contain PVC polymers.

SUMMARY OF THE INVENTION

The present invention provides a sheet material that combines good surface weatherability and hardness with overall good elongation for ease of application, while avoiding the use of plasticized PVC polymers. By constructing the base coat layer of a composition having greater elongation than the clear coat layer, the present invention is able to produce a paint film or decal capable of hand application and repositioning.

The foregoing advantageous characteristics of the invention are achieved by a flexible decorative sheet material, useful as a paint film, comprised of multiple layers. A substantially transparent fluoropolymer clear coat layer is cast, sprayed or coated onto a smooth surfaced film carrier, preferably a PET film carrier, such that the clear coat layer is releasably adhered to the film carrier. A pigmented fluoropolymer base coat layer is then cast, sprayed or coated onto the clear coat layer. A pressure sensitive adhesive layer is coated onto a silicone coated release liner, preferably a PET or polyolefin release liner, such that the pressure sensitive adhesive layer is releasably adhered to one surface of the release liner. The pressure sensitive adhesive layer is then laminated to the undersurface of the pigmented fluoropolymer base coat layer. The base coat layer and the clear coat layer each comprise an alloy of a fluoropolymer composition and an acrylic polymer composition.

The fluoropolymer composition is a polyvinylidene fluoride composition wherein the specific composition of each layer is chosen so that the base coat layer has a relatively greater elongation than the clear coat layer. In the preferred embodiment of the present invention, the clear coat layer contains a fluoropolymer homopolymer composition and the base coat layer contains a fluoropolymer copolymer composition. The fluoropolymer homopolymer composition should have a produced elongation at break of about 50% to 250%. The fluoropolymer copolymer composition should have a produced elongation at break of about 300% to 400%. In one embodiment of the present invention, the acrylic polymer composition is a polyethyl methacrylate.

BRIEF DESCRIPTION OF THE DRAWINGS

Figure 1:
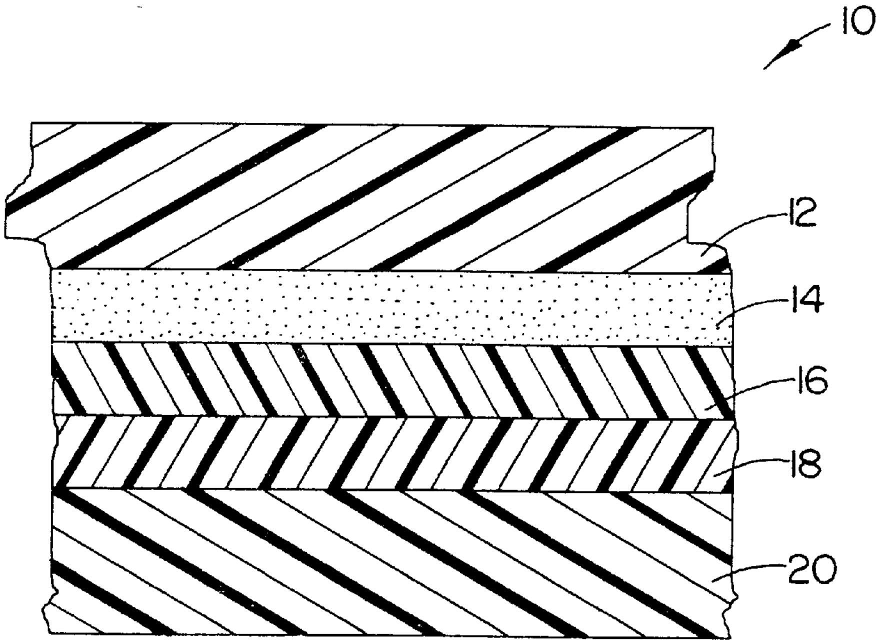

Having thus described the invention in general terms, reference will now be made to the accompanying drawings, which are not necessarily drawn to scale, and wherein:

FIG. 1 is a cross sectional view of a decorative sheet material of the present invention.

Figure 2:
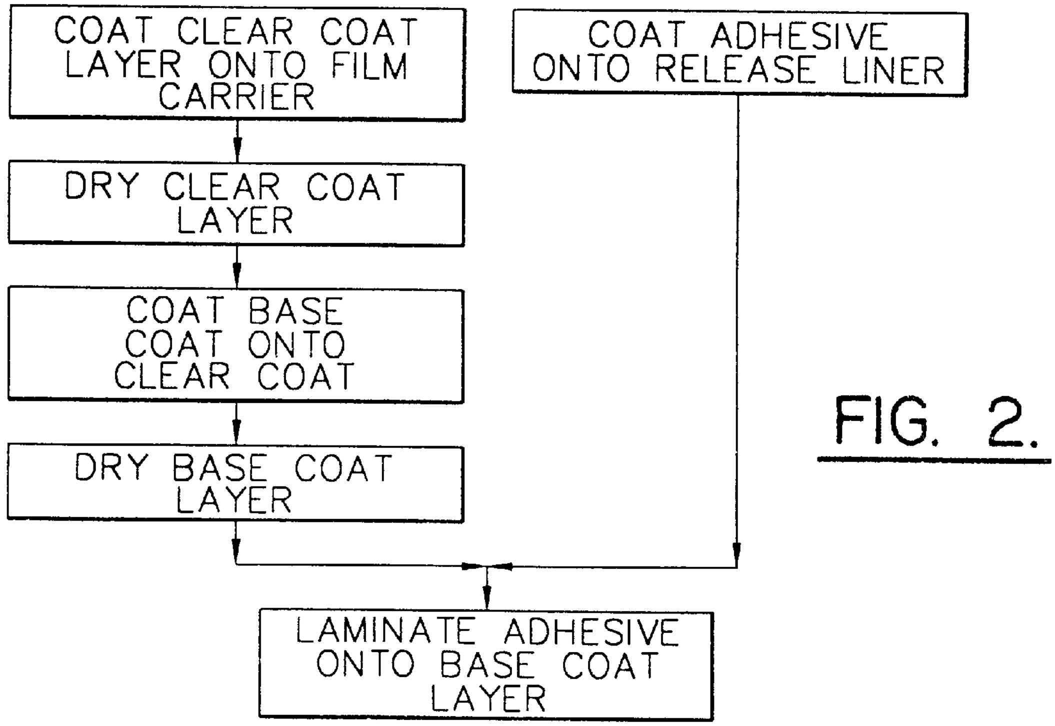

FIG. 2 is a block diagram illustrating the process of manufacturing the decorative sheet material of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A decorative sheet material 10 of the present invention is illustrated in FIG. 1. The sheet material 10 comprises a substantially clear fluoropolymer clear coat layer 18 cast or coated on one surface of a film carrier 20, a pigmented fluoropolymer base coat layer 16 cast, sprayed or coated onto the clear coat layer 18, a pressure sensitive adhesive layer 14 releasably adhered to one surface of a release liner 12 and laminated, or otherwise affixed, to the pigmented base coat layer 16. FIG. 2 illustrates the basic process of manufacturing the paint film of the present invention.

The film carrier 20 comprises a polyester casting film having a high gloss surface. The film carrier 20 is important for high gloss applications because it imparts high gloss and high DOI to the finished composite sheet. The film carrier 20 is removed and replaced with a protective masking film to serve as a protective layer to prevent marring and to facilitate application of the film to the substrate. The preferred film thickness for the film carrier 20 is about 2 mils (0.002 inches).

The preferred material for constructing the film carrier sheet 20 is polyethylene terephthalate (PET). PET films useful as a carrier for casting are manufactured in a number of grades depending on end use requirements. Most grades contain particulate materials to roughen the surface for improved slip for roll winding. However, such additives increase surface haze and lower the gloss and DOI of the clear coat and are undesirable for film finish applications. PET films with no slip additives are commercially available and recommended for use in the present invention.

The clear coat layer 18 is a substantially transparent thermoplastic coating composition coated in thin film form onto the surface of the film carrier sheet 20 in a liquid state. The preferred clear coat layer thickness is about 1 mil (0.001 inches). The clear coat 18 is coated onto the carrier sheet 20 by conventional coating or casting techniques such as reverse roll coating or postmetered coating techniques. Postmetered coating techniques known in the art are preferred. Postmetered coating involves coating the clear coat layer 18 onto the film carrier sheet 20 as the film carrier sheet passes over an applicator roll. The coated film carrier sheet 20 then passes between the applicator roll and a metering roll spaced a predetermined distance from the applicator roll and rotating in the same direction as the applicator roll. Coating thickness is determined by the distance between the applicator roll and the metering roll.

The clear coat layer 18 is then dried using any conventional drying process. Preferably, the clear coat layer 18 is dried in an oven having multiple heating zones wherein each successive heating zone operates at a progressively higher temperature. Most preferably, the clear coat 18 is dried in an oven having six heating zones wherein heating zone temperatures are in the range from about 240° F. to about 375° F.

The clear coat layer 18 is comprised of a blend of a thermoplastic fluoropolymer composition and an acrylic polymer composition. In the preferred embodiment, the fluoropolymer composition used in the clear coat layer 18 should be a polyvinylidene fluoride (PVDF) homopolymer. The PVDF component is desirable because, in combination with the acrylic resin component, it provides excellent durability and weatherability characteristics as well as good room temperature elongation properties. The PVDF homopolymer should have a produced elongation at break of about 50% to 250%, wherein "produced elongation" refers to elongation at or near the time of manufacture (prior to significant aging). The clear coat layer 18 should contain about 50% to 75% fluoropolymer composition by weight. The PVDF material preferred for the clear coat is known as KYNAR (a trademark of Elf Atochem).

KYNAR is a high molecular weight thermoplastic polymer with excellent chemical inertness and strong resistance to most oxidizing agents, acids, and bases. KYNAR also exhibits high mechanical strength and excellent stability in extreme weather conditions and during UV light exposure. Specifically, the preferred embodiment of the present invention uses KYNAR 500 in the clear coat layer 18.

The acrylic resin component is desirable because of its compatibility with the PVDF fluoropolymer. The amount of acrylic resin added should be sufficient to yield a substantially transparent clear coat layer in dry film form. The DOI, gloss, hardness and transparency of the clear coat increase proportionally with increases in acrylic resin content. However, elongation decreases with increasing acrylic resin content. Therefore, the amount of acrylic resin added must be at a level sufficient for acceptable levels of both elongation and appearance. The clear coat layer 18 should contain about 25% to 50% acrylic resin by weight. The preferred acrylic resin for use in the present invention is polyethyl methacrylate, such as ELVACITE (a trademark of Du Pont). Specifically, the preferred polyethyl methacrylate is ELVACITE 2042 produced by ICI.

The clear coat layer 18 can be prepared as a solution of PVDF and acrylic resin in solvent. Alternatively, the clear coat 18 could be formulated as a dispersion of PVDF in a solution of acrylic resin. The preferred method of preparation is blending the PVDF and acrylic resin components in a diethylene glycol monobutyl ether acetate (DB Acetate), propylene glycol monomethyl ether acetate (PM Acetate) and dimethyl phthalate (DMP) solution. Advantageously, a UV screener, preferably TINUVIN 900, is also added to the solution.

The base coat layer 16 can be applied to the clear coat layer 18 by any of a number of conventional coating and casting methods such as reverse roll coating or postmetered coating techniques. Postmetered coating techniques, such as the technique described for coating the clear coat layer 18, are preferred.

The base coat layer 16 is then dried using conventional drying techniques. Preferably, the base coat layer 16 is dried in an oven having multiple heating zones wherein each successive heating zone operates at a progressively higher temperature. Most preferably, the base coat 16 is dried in an oven having six heating zones wherein heating zone temperatures are in the range from about 270° F. to about 400° F. The preferred thickness of the base coat 16 is about 1.5 mil to 2.0 mil (0.0015 to 0.0020 inches).

The base coat 16 comprises a flexible synthetic resinous coating composition containing a uniformly dispersed pigment to provide the appearance necessary for exterior automobile use. The base coat 16 contains a blend of a thermoplastic fluoropolymer composition and an acrylic polymer composition. The preferred polymer blend for use in the present invention is an alloy of polyethyl methacrylate and a polyvinylidene fluoride (PVDF) copolymer. The PVDF copolymer provides better elongation than the PVDF homopolymer used in the clear coat layer 18, thereby increasing the elongation of the resulting film. The PVDF copolymer should have an elongation at break of about 300% to 400%. The preferred PVDF copolymers are KYNAR 2751 and SOLEF 21508/1001, copolymers of vinylidene fluoride (VDF) and hexafluoropropylene (HFP) produced by Elf Atochem and Solvay, respectively. In the preferred embodiment, the copolymer is processed in an air mill to a maximum particle size of less than 18.5 microns and a mean particle size of less than 8.0 microns. ELVACITE 2042 is the preferred acrylic polymer. The base coat layer 16 should contain about 15% to 35% acrylic resin by weight. Preferably, the base coat layer 16 should contain about 20% acrylic resin by weight. The specific pigment used in the base coat 16 are chosen as desired depending on the desired color. The base coat 16 employed may include conventional pigments as well as metallic flakes or pearlescenes.

The base coat layer 16 can be prepared as a solution of PVDF and acrylic resin in solvent. Alternatively, the base coat could be formulated as a dispersion of PVDF in a solution of acrylic resin. The preferred method of preparation is blending the PVDF and acrylic resin components in a diethylene glycol monobutyl ether acetate (DB Acetate) and dimethyl phthalate (DMP) solution. Alternatively, the base coat layer 16 may be coated from a solvent solution such as methyl ethyl ketone (MEK) or N-methyl-2-pyrrolidone (such as M-PYROL from GAF Corp.). In the preferred embodiment, a UV screener and hindered amine stabilizer, preferably TINUVIN T-384 and TINUVIN T-123, respectively, are also added to the solution.

The pressure sensitive adhesive layer 14 is first coated on the release liner 12, dried and then laminated onto the base coat 16. The adhesive layer 14 bonds the paint film to the surface of a substrate, such as an exterior automobile panel. Advantageously, the chosen adhesive should exhibit a low initial tackiness to facilitate repositioning of the paint film. The pressure sensitive adhesive layer 14 can be coated from solution or hot-melt extruded onto a smooth surfaced polyester or polyolefin casting sheet or liner in a separate operation. If the adhesive layer 14 is coated from solution, the adhesive is then dried using any conventional drying process. The preferred adhesive coat 14 comprises an acrylic-based synthetic resinous material. Specifically, Monsanto 2591 or 1159 are the preferred pressure sensitive adhesives. It is important that the release liner 12 have a smooth surface because any surface irregularities can be reflected through the clear coat 18, thereby affecting the appearance of the final product. In the preferred embodiment, a silicone coated PET or polyolefin liner is used for the release liner 12.

Other combinations of clear coat/base coat fluoropolymer compositions could also be used to practice the present invention. Both the base coat and the clear coat layers could be formulated using a PVDF homopolymer. However, such a formulation loses elongation with aging due to the crystallization of the PVDF. The resulting low elongation or brittleness makes application and repositioning of the film more difficult. Similarly, both the base coat and the clear coat layers could be formulated using a PVDF copolymer. Such a formulation would yield elongation ranges so high that the film would be prone to stretching and distortion of the image during application and repositioning. Also, the copolymer clear coat is less mar resistant than a clear coat constructed with a homopolymer and would not meet hardness requirements. Alternatively, without departing from the scope of the present invention, the PVDF homopolymer and PVDF copolymer could be blended together to form the fluoropolymer composition in one or both of the paint film layers.

The paint film of the present invention combines a high gloss/high DOI finish with sufficient hardness and weatherability for use as an exterior automobile finish. The present invention also provides a paint finish that exhibits good room temperature elongation for ease of application and repositioning without the use of plasticized PVC. By using a PVDF homopolymer in the clear coat composition and a PVDF copolymer in the base coat composition, the present invention combines good elongation with a durable, glossy exterior finish.

EXAMPLE 1

Film candidates were made for evaluation with regard to hand application and repositioning. Each set of samples comprised one example of each of the three combinations of fluoropolymer compositions discussed above: PVDF copolymer base coat/clear coat, PVDF homopolymer base coat/clear coat, and PVDF homopolymer clear coat/ PVDF copolymer base coat.

For the first set of samples, the clear coat layer was cast onto a PET liner. A base coat layer was then pigmented and cast onto the clear coat layer to make a base coat/clear coat finish. Base coat and clear coat layers were made 1 mil in thickness. Monsanto 1159 pressure sensitive adhesive was coated on a PET release paper and laminated to the base coat/clear coat samples to complete the sample preparation. The following formulations were used for the samples described in greater detail below.

FORMULA 1

| Ingredient | Parts |
|---|---|
| DB Acetate | 26.13 |
| Dimethyl Phthalate (DMP) | 5.81 |
| PM Acetate | 26.13 |
| KYNAR 500 | 28.85 |
| ELVACITE 2042 | 12.36 |
| TINUVIN T900 | .72 |

FORMULA 2

| Ingredient | Parts |
|---|---|
| DB Acetate | 43.64 |
| DMP | 10.91 |
| KYNAR 2751 | 36.00 |
| ELVACITE 2042 | 9.00 |
| TINUVIN T900 | 0.45 |

| FORMULA 3 | |
|---|---|
| Ingredient | Parts |
| DB Acetate | 43.66 |
| DMP | 10.92 |
| KYNAR 2751 | 36.38 |
| ELVACITE 2042 | 9.04 |
| TINUVIN T-123 | 0.10 |
| TINUVIN T-384 | 0.20 |

| FORMULA 4 | |
|---|---|
| Ingredient | Parts |
| Formula 3 | 150.00 |
| Black dispersion 29B407 | 15.00 |
| DB Acetate/DMP (80/20) | 5.00 |

| FORMULA 5 | |
|---|---|
| Ingredient | Parts |
| Formula 1 | 150.00 |
| Black dispersion 29B407 | 15.0 |
| DB Acetate | 11.0 |

| FORMULA 6 | |
|---|---|
| Ingredient | Parts |
| Formula 1 | 135.00 |
| Black dispersion 29B407 | 13.50 |
| DB Acetate | 8.00 |

The first sample was a PVDF homopolymer clear coat/ PVDF copolymer base coat combination wherein the clear coat (CC) layer was created using Formula 1 above and the base coat (BC) was created using Formula 4 above. Black dispersion 29B407 is a pigment dispersion manufactured by Penn Color. The second sample used PVDF copolymer construction for both clear coat and base coat layers wherein the clear coat layer was created using Formula 3 above and the base coat layer was created using Formula 4 above. The final sample used a PVDF homopolymer construction for both layers wherein the clear coat was made using Formula 1 and the base coat layer was made using Formula 5.

The three samples exhibited different elongation properties as represented by the table below. The percent elongation was measured in both the machine direction and the transverse direction both before and after heat aging. An initial, produced elongation was measured at the time of manufacture and heat aged elongation was measured after exposing the samples to a temperature of 176° F. for seven days.

The sample comprising a clear coat layer made with a PVDF homopolymer and a base coat layer made with a PVDF copolymer exhibited elongation properties most conducive to application and repositioning of paint or decal films. Paint films with initial and/or heat aged elongation above about 550% are difficult to handle resulting in distortion of the film during installation. Films with initial elongation below about 410% or aged elongation below about 150% are also difficult to handle and do not conform readily to the compound surfaces present in automobile applications.

HEAT AGED ELONGATION STUDY - SET 1

| | Elongation (%) | | | |
|---|---|---|---|---|
| | Machine Direction | | Transverse Direction | |
| Description | Initial | Aged | Initial | Aged |
| PVDF homopolymer CC/ PVDF copolymer BC | 520 | 402 | 518 | 434 |
| PVDF copolymer CC/ PVDF copolymer BC | 617 | 543 | 590 | 565 |
| PVDF homopolymer CC/ PVDF homopolymer BC | 388 | 71 | 408 | 114 |

EXAMPLE 2

The second set of samples were manufactured in the same manner as the first set of samples except that the base coat layer was cast at a thickness of 2 mils. rather than 1 mil. The first sample comprised of a Formula 4 base coat cast on top of a Formula 1 clear coat (PVDF homopolymer CC/ PVDF copolymer BC). The second sample comprised a Formula 6 base coat cast on top of a Formula 1 clear coat (PVDF homopolymer CC/PVDF homopolymer BC). The final sample comprised a Formula 4 base coat cast on top of a Formula 3 clear coat (PVDF copolymer CC/PVDF copolymer BC).

An elongation study was conducted on the above-described samples in the same manner as the previous elongation study, except that the heat aging measurements were made after exposure to 176° F. for three days. The results appear in the following table. Again, the film combination comprising a clear coat layer with a PVDF homopolymer fluoropolymer composition and a base coat layer with a PVDF copolymer fluoropolymer composition exhibited elongation properties most conducive to paint film application and repositioning.

HEAT AGED ELONGATION STUDY - SET 2

| | Elongation (%) | | | |
|---|---|---|---|---|
| | Machine Direction | | Transverse Direction | |
| Description | Initial | Aged | Initial | Aged |
| PVDF homopolymer CC/ PVDF copolymer BC | 489 | 419 | 480 | 381 |
| PVDF copolymer CC/ PVDF copolymer BC | 332 | 22 | 81 | 11 |
| PVDF homopolymer CC/ PVDF homopolymer BC | 518 | 488 | 489 | 498 |

Additionally, the tensile yield of the second set of samples was measured in both the machine direction and transverse direction. The tensile yield was measured at an initial, produced state and also at a heat aged state. The heat aged value was measured after exposing the samples to a temperature of 176° F. for three days.

TENSILE YIELD BEFORE AND AFTER HEAT AGING

| | Tensile Yield (psi) | | | |
|---|---|---|---|---|
| | Machine Direction | | Transverse Direction | |
| Description | Initial | Aged | Initial | Aged |
| PVDF homopolymer CC/ PVDF copolymer BC | 3323 | 4637 | 3517 | 4670 |
| PVDF copolymer CC/ PVDF copolymer BC | 4943 | 7183 | 4703 | 6600 |
| PVDF homopolymer CC/ PVDF homopolymer BC | 2883 | 3640 | 2443 | 3590 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A flexible weatherable decorative sheet material useful as a paint film, comprising:

a pigmented fluoropolymer base coat layer, and a substantially transparent fluoropolymer clear coat layer overlying said base coat layer and adhered thereto, and wherein said base coat layer has an elongation greater than said clear coat layer.

2. A sheet material according to claim 1, further comprising an adhesive layer on the undersurface of said base coat layer.

3. A sheet material according to claim 2, further comprising a release liner releasably adhered to the undersurface of said adhesive layer.

4. A sheet material according to claim 3, wherein said release liner comprises a polyethylene terephthalate film.

5. A sheet material according to claim 1, wherein said base coat layer and said clear coat layer each comprise an alloy of a fluoropolymer composition and an acrylic polymer composition, and wherein the fluoropolymer composition of said base coat layer has a greater elongation than the fluoropolymer composition of said clear coat layer.

6. A sheet material according to claim 5, wherein said base coat layer is made of a fluoropolymer copolymer composition and said clear coat layer is made of a fluoropolymer homopolymer composition.

7. A sheet material according to claim 5, wherein said base coat layer comprises a fluoropolymer composition having a produced elongation at break of about 300 percent or greater and said clear coat layer comprises a fluoropolymer composition having a produced elongation at break of from about 50 percent to about 250 percent.

8. A flexible weatherable decorative sheet material useful as a paint film, comprising:

an adhesive layer, a pigmented base coat layer overlying said adhesive layer, said base coat layer comprising an alloy of an acrylic polymer composition and a relatively greater elongation polyvinylidene fluoride composition, and a substantially transparent clear coat layer overlying said base coat layer and adhered thereto, said clear coat layer comprising an alloy of an acrylic polymer composition and a relatively lower elongation polyvinylidene fluoride composition.

9. A sheet material according to claim 8, wherein said relatively greater elongation polyvinylidene fluoride composition comprises a copolymer of vinylidene fluoride and hexafluoropropylene.

10. A sheet material according to claim 9, wherein said acrylic polymer composition comprises a polyethyl methacrylate.

11. A flexible weatherable decorative sheet material useful as a paint film, comprising:

a release liner, an adhesive layer releasably adhered to said release liner, a pigmented fluoropolymer base coat layer overlying said adhesive layer and adhered thereto, a substantially transparent fluoropolymer clear coat layer overlying said base coat layer and adhered thereto, and wherein said base coat layer has an elongation greater than said clear coat layer, and a film carrier overlying said clear coat layer and releasably adhered thereto.

12. A method for making a flexible, weatherable decorative sheet material useful as a paint film, comprising the steps of:

coating a substantially transparent fluoropolymer clear coat layer onto a film carrier, and applying to the exposed surface of said clear coat layer a coating of a pigmented fluoropolymer base coat layer, wherein said base coat layer has an elongation greater than said clear coat layer.

13. A method according to claim 12, further comprising the steps of:

coating an adhesive layer onto a release liner to form a releasably adhered adhesive layer, and laminating the exposed surface of the releasably adhered adhesive layer onto the undersurface of the base coat layer.

14. A method according to claim 12 wherein said coating step comprises coating the clear coat layer onto a smooth surfaced polyethylene terephthalate film.

15. A method for making a flexible, weatherable decorative sheet material useful as a paint film, comprising the steps of:

coating a substantially transparent fluoropolymer clear coat layer onto a film carrier, the clear coat layer comprising an alloy of a polyvinylidene fluoride homopolymer and an acrylic polymer composition, drying the clear coat layer, applying to the exposed surface of the clear coat layer a coating of a pigmented fluoropolymer base coat layer, the base coat layer comprising an alloy of a polyvinylidene fluoride copolymer and an acrylic polymer composition, the base coat layer having an elongation greater than the clear coat layer, drying the base coat layer, coating an adhesive layer onto a release liner to form a releasably adhered adhesive layer, and laminating the exposed surface of the releasably adhered adhesive layer onto the undersurface of the base coat layer.

* * * * *

UNITED STATES PATENT AND TRADEMARK OFFICE
CERTIFICATE OF CORRECTION

PATENT NO. : 6,096,396

DATED : August 1, 2000

INVENTOR(S) : Patton et al.

It is certified that error appears in the above-identified patent and that said Letters Patent is hereby corrected as shown below:

Column 8, in the Second Table (lines 48-60) under the first sub-heading, lines 3 and 4, "copolymer" should read --homopolymer--; lines 5 and 6, "homopolymer" should read --copolymer--.

Column 9, in the Table (lines 1-15) under the first sub-heading, lines 3 and 4, "copolymer" should read --homopolymer--; lines 5 and 6, "homopolymer" should read --copolymer--.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*